United States Patent
Park et al.

(10) Patent No.: US 7,766,214 B2
(45) Date of Patent: Aug. 3, 2010

(54) FRICTION STIR WELDING METHOD

(75) Inventors: Seung Hwan Park, Hitachinaka (JP); Satoshi Hirano, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 106 days.

(21) Appl. No.: 11/655,203

(22) Filed: Jan. 19, 2007

(65) Prior Publication Data

US 2007/0181649 A1     Aug. 9, 2007

(30) Foreign Application Priority Data

Feb. 7, 2006   (JP) .............................. 2006-029111

(51) Int. Cl.
*B23K 20/12*     (2006.01)

(52) U.S. Cl. ..................... 228/112.1; 228/2.1

(58) Field of Classification Search .............. 228/112.1, 228/2.1
See application file for complete search history.

(56) References Cited

U.S. PATENT DOCUMENTS

| | | | | |
|---|---|---|---|---|
| 6,053,391 A * | 4/2000 | Heideman et al. | ............ | 228/2.1 |
| 2002/0047037 A1 * | 4/2002 | Shinoda et al. | .......... | 228/112.1 |
| 2003/0192941 A1 * | 10/2003 | Ishida et al. | ............. | 228/112.1 |
| 2005/0077427 A1 | 4/2005 | Brenner et al. | | |
| 2005/0116012 A1 * | 6/2005 | Packer et al. | ............. | 228/112.1 |

FOREIGN PATENT DOCUMENTS

| | | |
|---|---|---|
| JP | 2004-314115 | 11/2004 |
| WO | WO 93/10935 A1 | 6/1993 |

* cited by examiner

*Primary Examiner*—Jessica L Ward
*Assistant Examiner*—Megha Mehta
(74) *Attorney, Agent, or Firm*—Antonelli, Terry, Stout & Kraus, LLP.

(57) ABSTRACT

The invention provides a friction stir welding method of forming a weld portion having an excellent fatigue property in the case of welding a weld material by using a friction stir welding method. The invention provides a friction stir welding method structured such as to insert a tool provided in such a manner that a pin-shaped probe protrudes to an end surface of a columnar member to a weld material in a state of being rotated, and move the tool in a state of being rotated, thereby welding two or more weld materials in accordance with a friction stirring, in which a cavity portion is provided in a part of a weld portion of the weld material, a member is formed in the cavity portion, and the weld material is welded by the friction stirring. In accordance with the invention, since an unwelded portion is not formed near the cavity portion, a notch effect is reduced, and it is possible to form the weld member which is excellent in the fatigue property.

9 Claims, 6 Drawing Sheets

5 mm

FRICTION STIR WELDING METHOD

BACKGROUND OF THE INVENTION

1. Field of the Invention

The present invention relates to a friction stir welding method and a weld structure welded by the friction stir welding method.

2. Description of Related Art

A friction stir welding method is described, for example, in patent document 1 (JP-B2-2712838 (WO93/10935)), the friction stir welding method is structured such as to insert a columnar member (hereinafter, refer to as a rotating tool) made of a substantially harder material than a weld material to a weld portion of the weld material while rotating, and move the rotating tool while rotating, thereby welding by a friction heat generated between the rotating tool and the weld material.

The welding method softens the weld material by the friction heat between the rotating tool and the weld material, utilizes a plastic flow phenomenon coming up with the rotation of the rotating tool, and is based on a different principle from a method of melting the weld material so as to weld, for example, an arc welding or the like.

There is a case that a cavity portion is provided near the weld portion at a time of manufacturing the weld structure having an excellent fatigue strength by using this welding method. An upper portion of the cavity portion is welded by inserting the rotating tool from a perpendicular direction to the weld surface while rotating at a high speed.

In this case, there is not used a backing metal supporting a load at a time of welding. Accordingly, in the case that the weld is executed near the cavity portion, there is a possibility that an unwelded root defect is formed in the weld portion, on the basis of a deformation of the member near the cavity portion.

Therefore, in the case that a stress is applied to the weld portion, an unwelded portion which tends to cause a notch effect is formed, or a stress concentration to the weld portion becomes higher, so that it is considered that fatigue properties are deteriorated. However, the formation of the unwelded portion has not been researched.

BRIEF SUMMARY OF THE INVENTION

An object of the present invention is to provide a friction stir welding method of forming a weld portion having an excellent fatigue property in the case of welding a weld material by using a friction stir welding method, and a weld structure.

A friction stir welding method in accordance with the present invention is structured such as to insert a rotating tool provided in such a manner that a pin-shaped probe protrudes to an end surface of a columnar member to a weld material in a state of being rotated, and move the rotating tool in a state of being rotated, thereby welding two or more weld materials in accordance with a friction stirring. Further, a cavity portion is provided in a part of a weld portion of the weld material, a member is formed in the cavity portion, and the weld material is welded by the friction stirring.

Further, in accordance with the present invention, there is provided a weld structure formed in a friction stir welding method of welding two or more weld materials in accordance with a friction stirring, whereby a cavity portion is provided in a part of a weld portion of the weld material, and a member is formed in the cavity portion.

In the case of welding in accordance with the friction stirring, there is a case that a weld is applied to a joint portion of the weld material, or there is a case that the weld is applied from one of the weld materials.

In this case, the cavity portion is preferably formed in a circular shape, and may be formed in a circular arc shape having a predetermined radius of curvature with respect to a direction of a weld portion of the weld material.

Further, the member embedded in the cavity portion is preferably constituted by a member having an approximately equal cross sectional shape to that of the cavity portion.

Further, the member formed in the cavity portion is preferably made of a harder material than the weld material, and a radius of the cavity portion is preferably equal to or less than one half of a thickness of the weld material.

In the case that the weld material is welded by using the friction stir welding method in accordance with the present invention, it is possible to provide the friction stir welding method of forming the weld portion having an excellent fatigue property and a weld structure.

Other objects, features and advantages of the invention will become apparent from the following description of the embodiments of the invention taken in conjunction with the accompanying drawings.

DETAILED DESCRIPTION OF THE INVENTION

A description will be given below of embodiments in accordance with the present invention with reference to the accompanying drawings.

Embodiment 1

Figure 1:
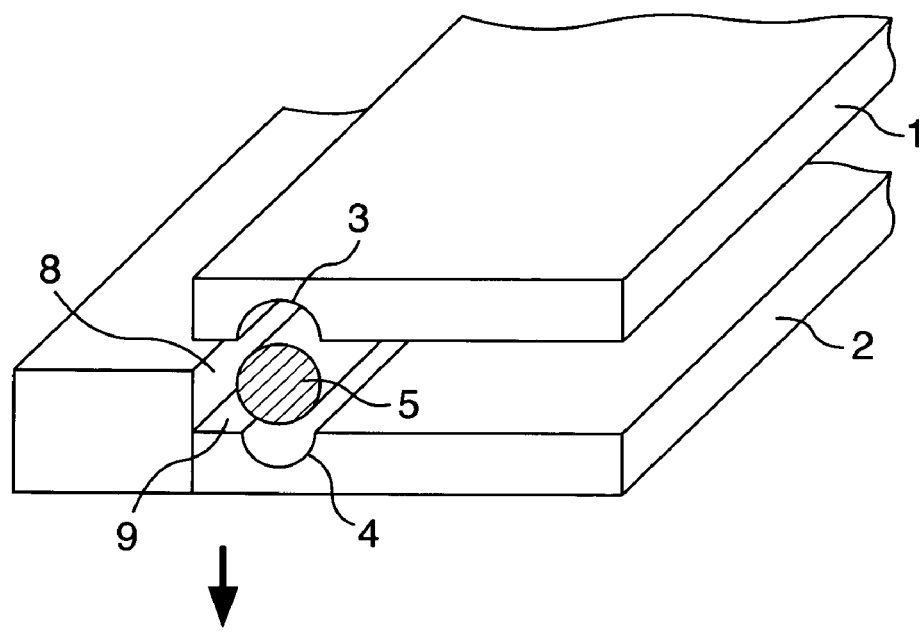
FIG. 1 is a conceptual view showing a positional relation between a weld material and an embedded member in accordance with one example of a welding method of the present invention.
Figure 2:
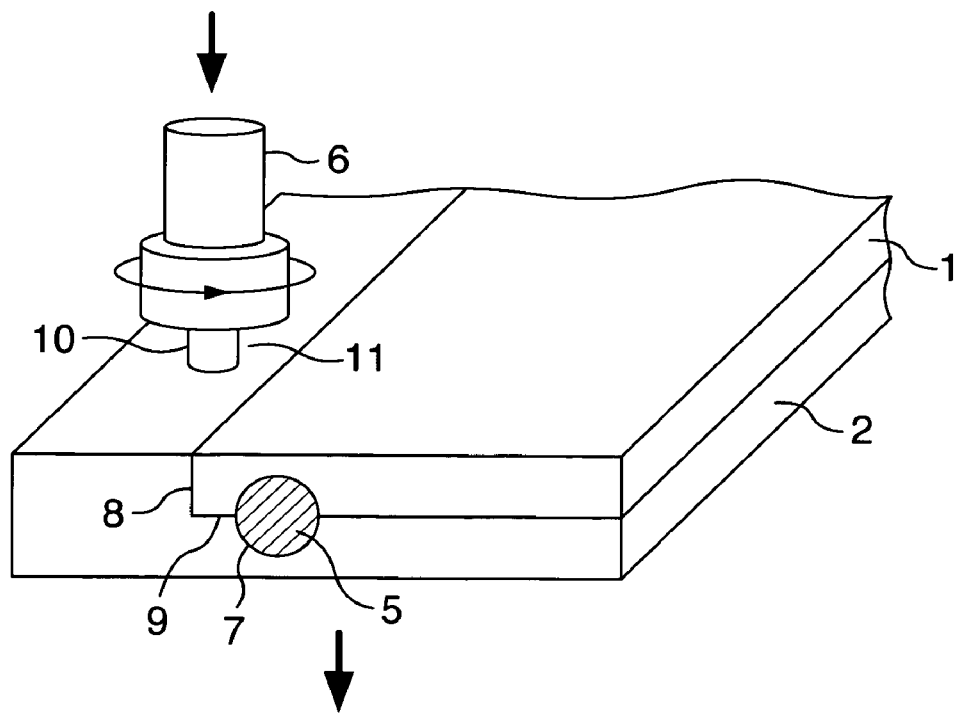
FIG. 2 is a conceptual view showing a state before welding in accordance with one example of the welding method of the present invention.
Figure 3:
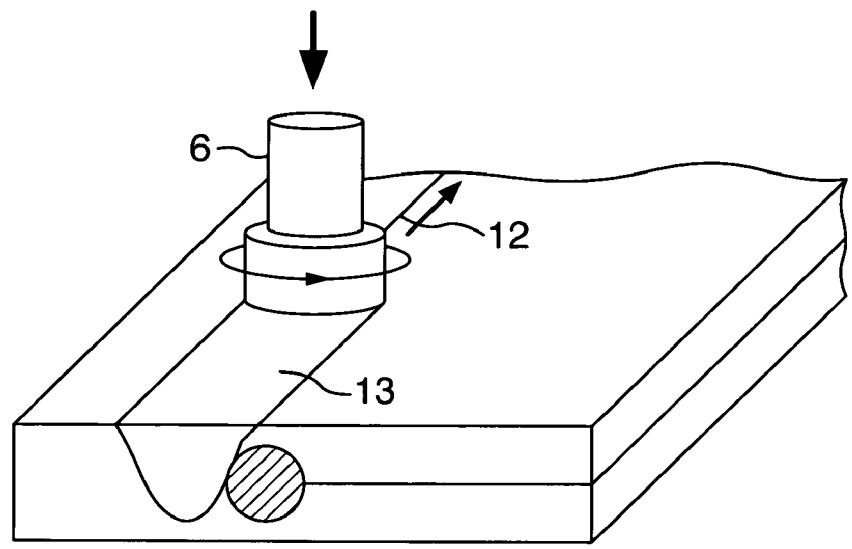
FIG. 3 is a conceptual view showing a state under welding in accordance with one example of the welding method of the present invention.

FIGS. 1, 2 and 3 show one example of a welding method in accordance with the present invention, and show a case of applying a friction stir welding method to a lap joint.

FIG. 1 shows a material 1 and a material 2 corresponding to a weld material. A cavity portion 3 and a cavity portion 4 respectively having semicircular cross sectional shapes are formed in the material 1 and the material 2.

A cavity portion having a circular cross sectional shape is formed at a time of lapping the material 1 and the material 2, thereby forming an embedded member 5 having an approximately equal cross sectional shape to the cavity portion. The material 1 and the material 2 corresponding to two weld materials having the cavity portions of the semicircular cross sectional shape are lapped via the embedded member 5.

Both of the material 1 and the material 2 are made of an aluminum alloy. An applied material is essentially constituted by a material which can be friction stir welded. For example, metals such as a magnesium alloy, a copper alloy, a steel material and the like correspond thereto.

Both of thicknesses of the material 1 and the material 2 are 10 mm. A thickness of the applied material is determined on the basis of an applied material, a friction stir welding apparatus and a capacity of a rotating tool, however, in the case of the aluminum alloy, it is possible to apply to the thickness between about 0.5 mm and 100 mm.

FIG. 2 is a conceptual view of a state in which the material 1, the material 2 and the embedded member 5 are set in such a manner as to be welded. The cavity portion 3 and the cavity portion 4 are lapped in such a manner that end portions thereof are aligned, and a cavity portion having a circular cross sectional shape is provided. The embedded member 5 is set to the cavity portion 7. The cross sectional shape of the embedded member 5 is approximately equal to that of the cavity portion 7. A radius of the cavity portion 7 formed by the cavity portion 3 and the cavity portion 4 having the semicircular cross sectional shape is about one half of the thickness of the material 1.

In other words, in order to form the weld portion having an excellent fatigue property, it is necessary to set a member having a larger radius of curvature than the unwelded portion formed near the weld portion.

Accordingly, the radius of the cavity portion 7 is larger than a gap of the lap surface formed by the material 1 and the material 2, and is limited to one half of the thickness of the material 1.

The embedded member 5 is made of a steel material, and is harder than the material 1 and the material 2.

In order to form the weld portion which is excellent in the fatigue property, the cross sectional shape of the cavity portion 7 and the embedded member 5 is not limited to the circular shape, but may be changed as far as a cross sectional shape has a large radius of curvature. For example, an oval shape or the like corresponds thereto.

Further, FIG. 2 shows a positional relation among the rotating tool 6, a weld line and a weld surface. The rotating tool 6 is inserted from a direction which is in parallel to the weld surface 8 and is perpendicular to the weld surface 9.

An end surface 11 close to the embedded member 5 in a probe 10 existing in an end portion of the rotating tool 6 is inserted in such a manner as to be approximately in contact with the embedded member 5, and a distance between the end surface 11 and the embedded member 5 at a time of inserting the rotating tool 6 is set to about 0.5 mm.

FIG. 3 shows a conceptual view of a state in which the rotating tool 6 is inserted to the weld surface 8 and the weld surface 9, and the material 1 and the material 2 are welded along the weld line 12.

The rotating tool 6 is rotated in a clockwise direction as seen from the above of the rotating tool 6. The weld makes progress toward a far side from a near side of the material.

As shown in FIG. 3, a stir zone 13 stirred by the rotating tool 6 is formed in the weld portion in such a manner as to be in contact with the embedded member 5. In accordance with the structure mentioned above, the unwelded portion is not formed between the stir zone 13 and the embedded member 5.

Figure 4:
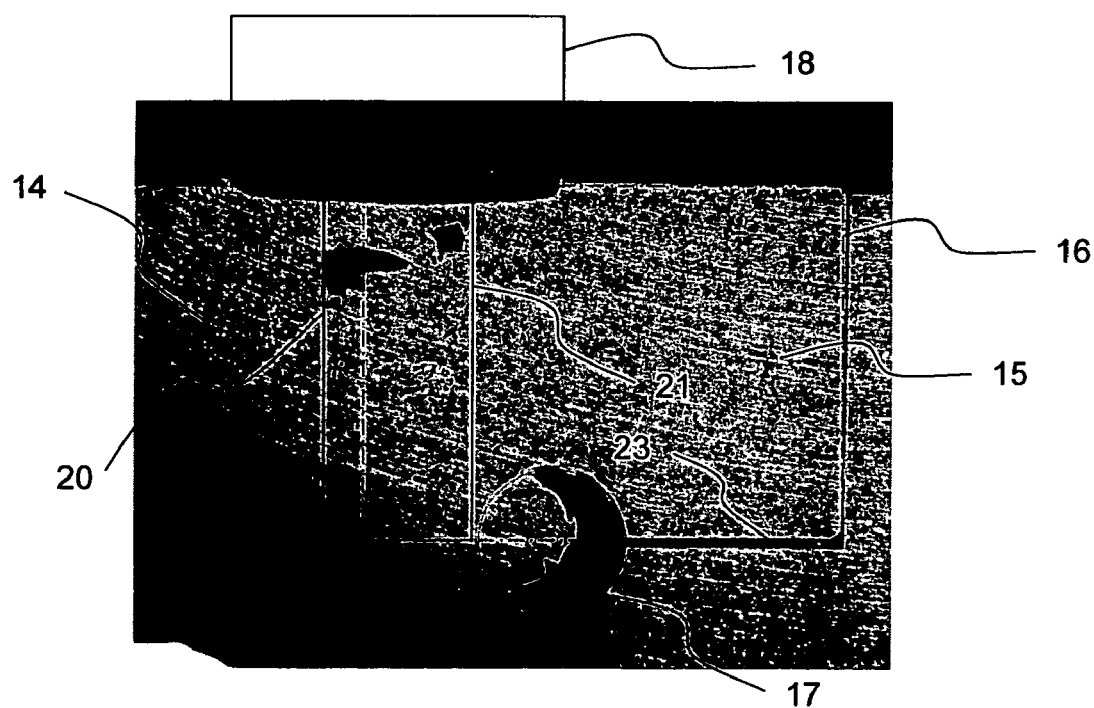
FIG. 4 is a view showing a defect generating condition in a weld portion having a cavity portion and a positional relation between a rotating tool and a weld member.

FIG. 4 shows a cross section to which the friction stir welding is applied by forming only the cavity portion without using the embedded member 5.

A positional relation between a material 14 and a material 15 is shown by a dotted line 16. A cavity portion obtained by lapping the semicircular cross sectional shape is provided on a surface in which the material 14 and the material 15 are brought into contact with each other. A shape of the cavity portion before the friction stir welding is applied thereto has a circular cross sectional shape as described by a dotted line 17.

A shape of the rotating tool 18 is structured such that a diameter of a shoulder portion is 10 mm, a diameter of a probe 20 is 4 mm, and a length of the probe 20 is 10 mm.

A description will be given of a positional relation between the rotating tool 18 and the cavity portion 17 by using FIG. 4. When the rotating tool 18 is inserted to the material 14 and the material 15, a distance between an end surface 21 of the probe 20 close to the cavity portion and the cavity portion 17 is 0.2 mm. A rotating speed of the rotating tool 18 is set to 1000 rotation/min, and a welding speed is set to 100 mm/min.

As is understood from FIG. 4, a shape of the cavity portion 17 after the friction stir welding is applied thereto is largely deformed, and loses the circular shape. This is because about some hundreds kg to about one ton load is applied to the weld portion by inserting and traveling the rotating tool 18 at a time of the friction stir welding, whereby the material exposed to the load of the material 14 and the material 15 flows into the cavity portion in case that a backing metal supporting the load does not exist.

As mentioned above, the shape of the cavity portion provided for improving the fatigue property of the weld portion collapses. In other words, since the surface having the large radius of curvature does not exist near the weld portion, and the unwelded portion is formed in the weld surface 23, the stress concentration to the weld portion becomes higher and the fatigue property is deteriorated, in the case that the stress is applied in the perpendicular direction to the weld surface 23.

Figure 5:
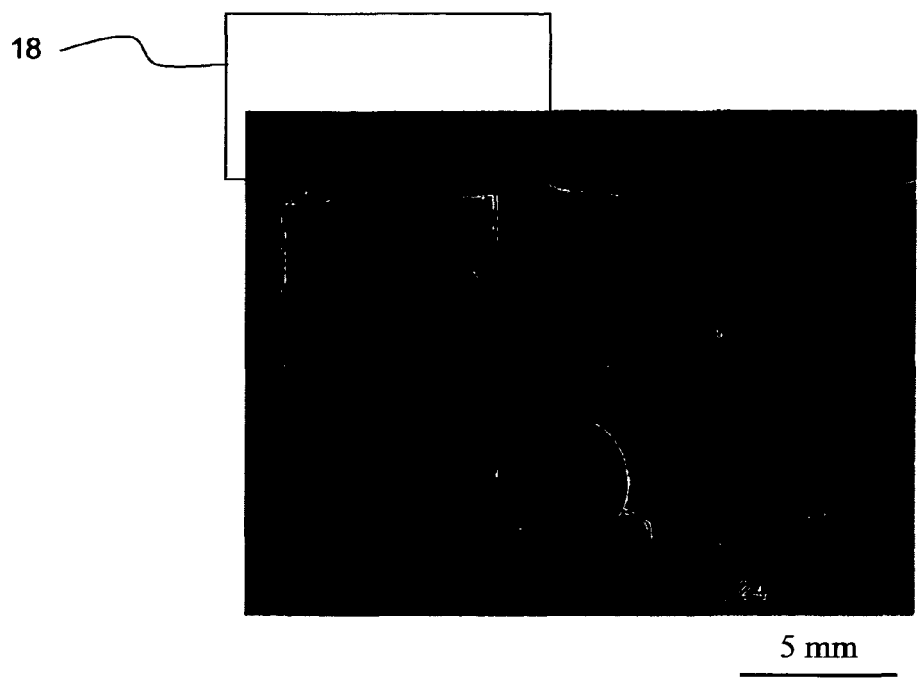
FIG. 5 is a view showing a cross sectional photograph in the weld portion using the embedded member.

On the contrary, FIG. 5 shows a cross section photograph in the case that the friction stir welding is applied by using the embedded member.

The positional relation between the rotating tool 18 and an embedded member 24 after the end of the welding is shown in FIG. 5. A welding condition is approximately equal to that shown in FIG. 4. There can be observed that the unwelded defect does not appear between the rotating tool 18 and the embedded member 24, and a complete weld is achieved. Even in the case that the stress is applied to the weld portion, the unwelded portion is not formed, and the surface to which the stress is applied exhibits the large curvature, so that it is possible to avoid the stress concentration.

As mentioned above, it is possible to improve the fatigue property of the weld portion by setting the embedded member in the cavity portion having the circular cross section so as to weld.

Figure 6:
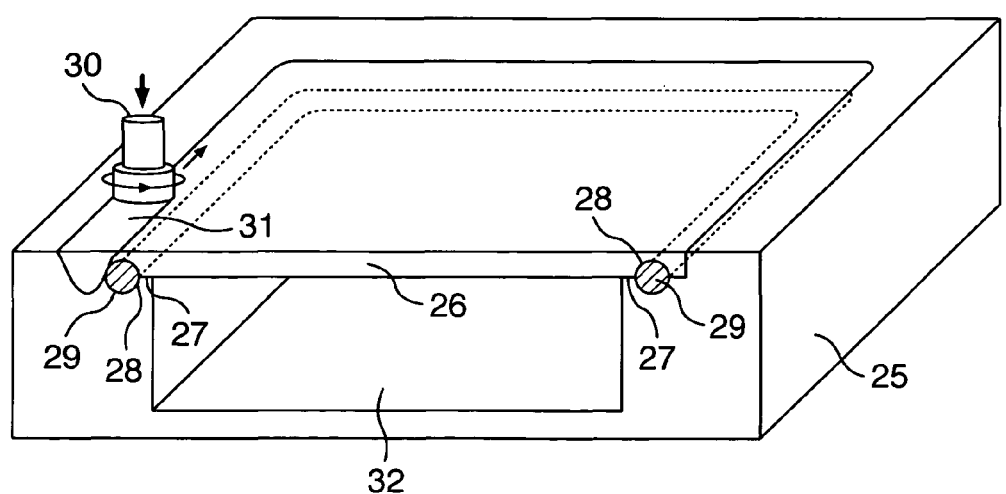
FIG. 6 is a conceptual view in the case of applying a frictional stir welding method using the embedded member to a weld structure.

FIG. 6 shows a conceptual view of a case that the welding method is applied to the weld structure.

The weld structure is constituted by a pressure container, and is structured such that a material 25 corresponding to a container and a material 26 corresponding to a lid are lapped over such that end portions are aligned with each other. A circular cavity portion 28 is provided in a surface 27 in which the material 25 and the material 26 are in contact with each other. A member 29 having an approximately equal cross sectional shape is embedded in the cavity portion 28. The material 25 and the material 26 are welded in accordance with a friction stir welding method by using a rotating tool 30.

A positional relation between the rotating tool 30 and the weld surface and a positional relation between the rotating tool 30 and the embedded member 29 is the same as those of FIGS. 1, 2 and 3.

The unwelded portion is not formed between a stir zone 31 formed thereby and the embedded member 29 even by applying the friction stir welding, and a surface having a large curvature is obtained. A space 32 is formed in an inner side thereof by welding the material 25 and the material 26. In the case that a repeated stress is applied to a direction perpendicular to the surface 27 by the space 32, the unwelded portion is not formed, so that it is possible to form a weld portion which is excellent in a fatigue strength.

The weld mentioned above can be applied to a weld structure to which the repeated stress is applied, for example, a cooling apparatus having a water channel, a pressure container or the like.

Embodiment 2

Figure 7:
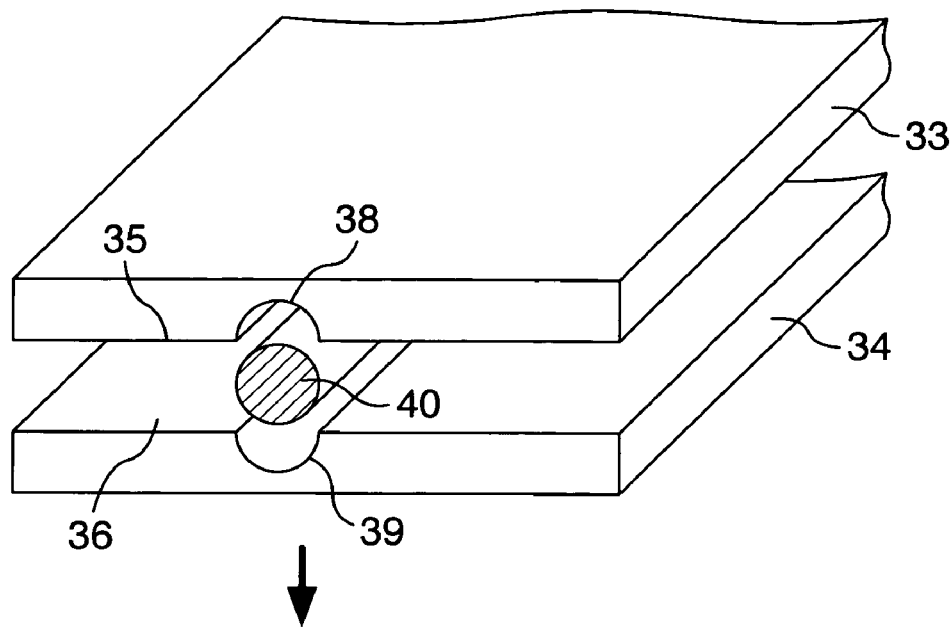
FIG. 7 is a conceptual view showing a positional relation between a weld material and an embedded member in accordance with one example of a lap welding method of the present invention.
Figure 8:
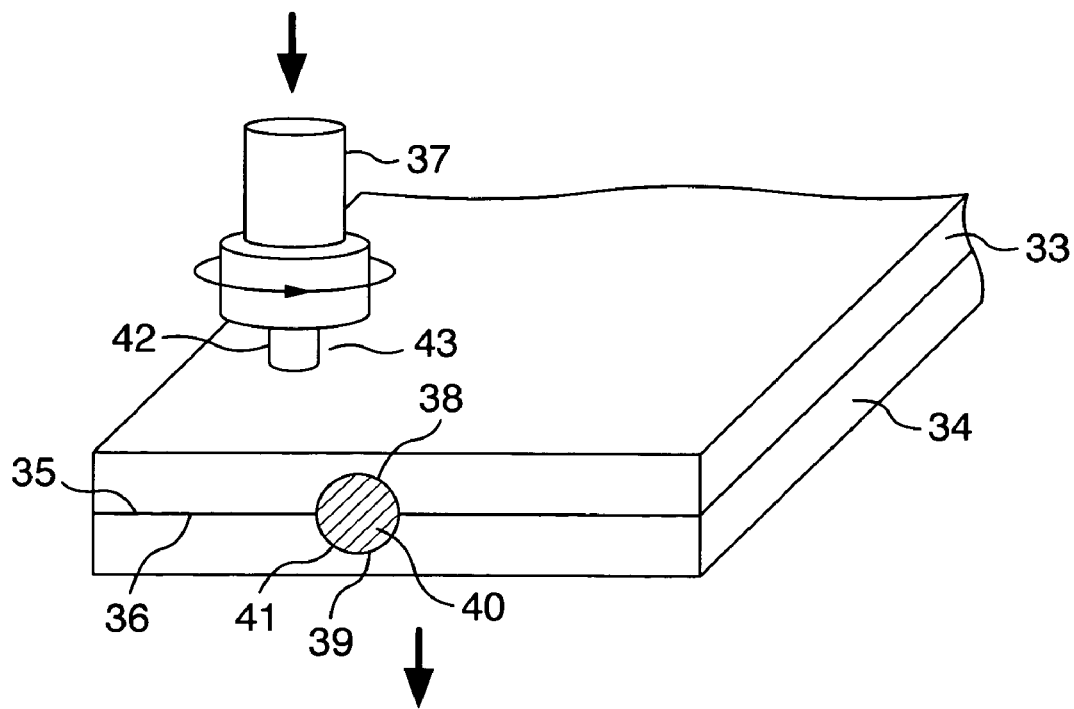
FIG. 8 is a conceptual view showing a state before welding in accordance with one example of the lap welding method of the present invention.
Figure 9:
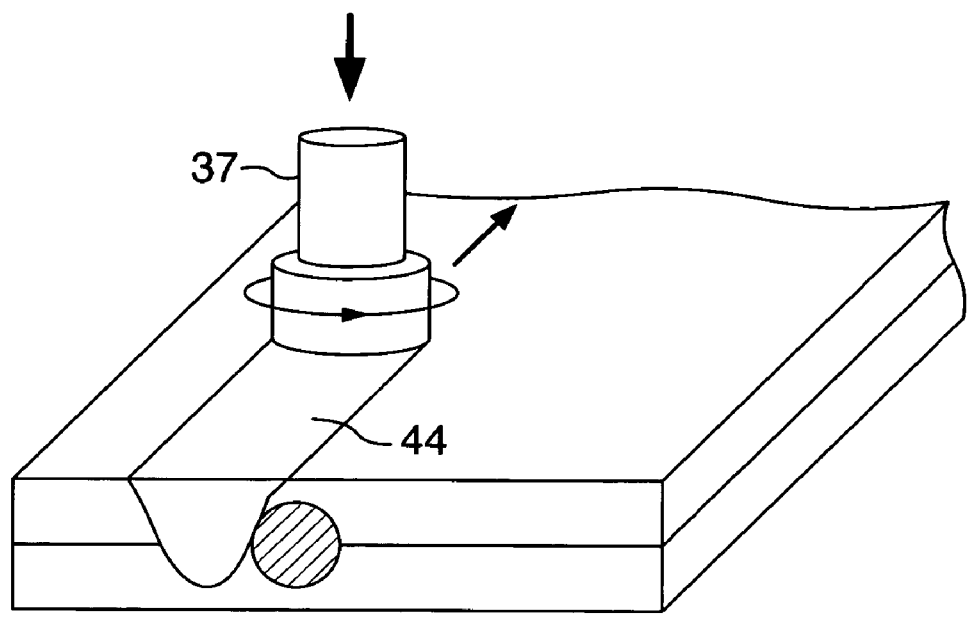
FIG. 9 is a conceptual view showing a state under welding in accordance with one example of the lap welding method of the present invention.

FIGS. 7, 8 and 9 show a welding method in accordance with the other embodiment of the present invention.

The present embodiment corresponds to a case that the present invention is applied to a lap joint, however, shapes of a material 33 and a material 34 are different from the material 1 and the material 2 of the embodiment 1.

FIG. 7 shows a positional relation among the material 33 and the material 34, a cavity portion 38 having a semicircular cross sectional shape and a cavity portion 39 having a semicircular cross sectional shape, and an embedded member 40 having a circular cross sectional shape. The cavity portion 38 and the cavity portion 39 are provided on a surface in which the material 33 and the material 34 are brought into contact with each other, that is, a butt weld surface 35 and a butt weld surface 36. Both of the material 33 and the material 34 are made of an aluminum alloy. The embedded member 40 is made of a harder material than the material 33 and the material 34, and is made of a steel material. Thicknesses of the material 33 and the material 34 are the same as those shown in the embodiment 1.

FIG. 8 is a conceptual view showing a state in which the material 33, the material 34, the cavity portion 38, the cavity portion 39 and the embedded member 40 are set in such a manner as to be welded.

FIG. 8 shows a positional relation among the butt weld surface 35, the butt weld surface 36 and a rotating tool 37. The rotating tool 37 is inserted from a direction perpendicular to the butt weld surface 35 and the butt weld surface 36.

A cavity portion 41 having a circular cross sectional shape is provided by lapping the cavity portion 38 and the cavity portion 39 in such a manner that end portions thereof are aligned with each other. The embedded member 40 is set to the cavity portion 41. A cross sectional shape of the embedded member 40 is approximately equal to the cavity portion 41. A radius of the cavity portion 41 formed by the cavity portion 38 having the semicircular cross sectional shape and the cavity portion 39 having the semicircular cross sectional shape is approximately one half of a thickness of the material 33, and is set to the same as described in the embodiment 1.

A positional relation between an end surface 43 of the embedded member 40 side in the probe 42 at a time of inserting the rotating tool 37 and the embedded member 40 is the same as described in the embodiment 1.

FIG. 9 shows a conceptual view of a state in which the material 33 and the material 34 are welded by inserting the rotating tool 37 to the butt weld surface 35 and the butt weld surface 36 from a direction of the material 33 while keeping the positional relation between the end surface 43 and the embedded member 40.

The rotating tool 37 is rotated in a clockwise direction as seen from the above of the rotating tool 37. A frictional stir welding makes progress toward a far side from a near side of the drawing.

As shown in FIG. 9, a stir zone 44 stirred by the rotating tool 37 is formed in the weld portion in such a manner as to be in contact with the embedded member 40, and an unwelded portion is not formed between the stir zone and the embedded member 40.

As a result, it is possible to improve a fatigue characteristic of the weld portion.

Embodiment 3

Figure 10:
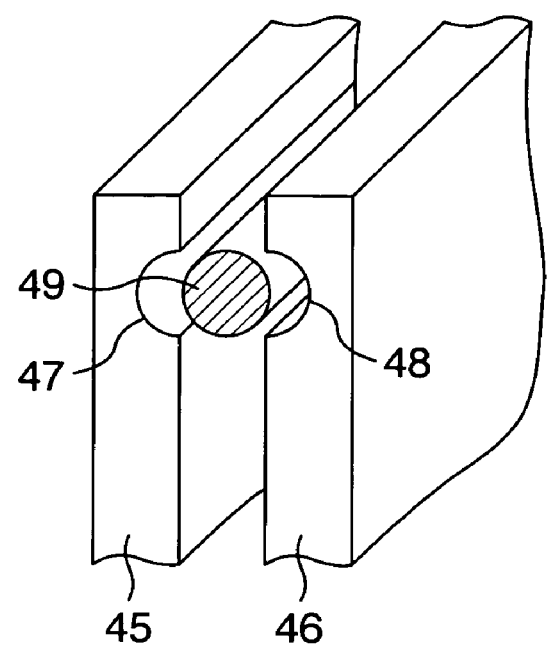
FIG. 10 is a conceptual view showing a positional relation between a weld material and an embedded member in accordance with one example of a butt welding method of the present invention.
Figure 11:
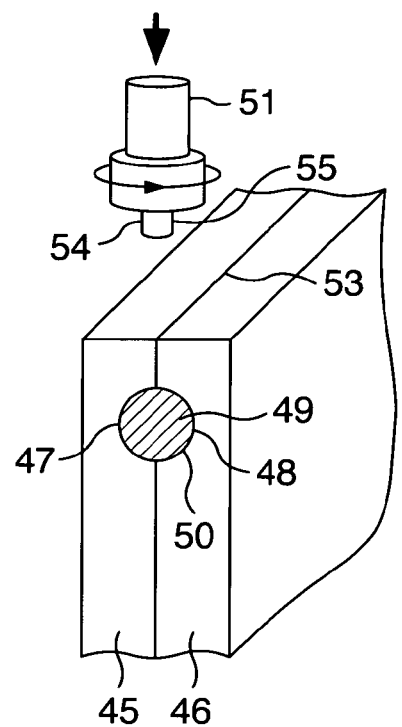
FIG. 11 is a conceptual view showing a state before welding in accordance with one example of the butt welding method of the present invention.
Figure 12:
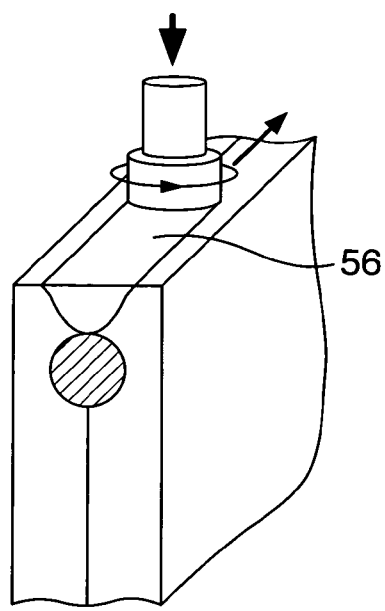
FIG. 12 is a conceptual view showing a state under welding in accordance with one example of the butt welding method of the present invention.

FIGS. 10, 11 and 12 show the other embodiment in accordance with the present invention. The embodiment corresponds to a case that the frictional stir welding is applied to a butt joint.

FIG. 10 shows a positional relation among a material 45 and a material 46, a cavity portion 47 having a semicircular cross sectional shape and a cavity portion 48 having a semicircular cross sectional shape, and an embedded member 49 having a circular cross sectional shape.

The cavity portion 47 and the cavity portion 48 are provided on a surface in which the material 45 and the material 46 are brought into contact with each other. Both of the material 45 and the material 46 are made of an aluminum alloy. An applied material is the same as described in the embodiment 1. Thicknesses of the material 45 and the material 46 are both set to 10 mm.

FIG. 11 is a conceptual view showing a state in which the material 45, the material 46, the cavity portion 47, the cavity portion 48 and the embedded member 49 are set in such a manner as to be welded.

A cavity portion 50 having a circular cross sectional shape is provided by lapping the cavity portion 47 and the cavity portion 48 in such a manner that end portions thereof are aligned with each other. A cross sectional shape of the embedded member 49 is approximately equal to the cavity portion 50. A radius of the cavity portion 50 formed by the cavity portion 47 and the cavity portion 48 is approximately one half of a thickness of the material 45 and the material 46.

FIG. 11 shows a positional relation between a rotating tool 51 and a weld line.

The rotating tool 51 is inserted from a direction perpendicular to a butt weld line 53. A lower end surface 55 in a probe 54 existing in an end portion of the rotating tool 51 is inserted to a position which is approximately in contact with the embedded member 49, and a distance between the end surface 55 and the embedded member 49 at a time of inserting the rotating tool 51 is set to about 0.1 mm.

FIG. 12 shows a conceptual view of a state in which the material 45 and the material 46 are welded by inserting the rotating tool 51 along the weld line 53.

The rotating tool 51 is rotated in a clockwise direction as seen from the above of the rotating tool 51. A welding makes progress toward a far side from a near side of the drawing.

As shown in FIG. 12, a stir zone 56 stirred by the rotating tool 51 is formed in the weld portion in such a manner as to be in contact with the embedded member 49.

In accordance with the structure mentioned above, an unwelded portion is not formed between the stir zone 56 and the embedded member 49. A load from about some hundreds of kg to about one ton is applied to the weld portion by inserting and traveling the rotating tool 51 at a time of the friction stir welding, however, since the embedded member 49 supporting the load is provided, the curvature is not changed, and the unwelded portion is not formed, so that it is possible to support the load. In the case that a repeated stress is applied in a perpendicular direction to the weld surface, the unwelded portion is not formed. Accordingly, it is possible to form the weld portion which is excellent in a fatigue strength.

In accordance with these embodiments, since the unwelded portion is not formed near the cavity portion, the notch effect is reduced, and it is possible to form the weld member which is excellent in the fatigue property.

The present invention relates to the friction stir welding method of welding in a state in which the cavity portion is provided in the weld surface, and the embedded member is formed in the cavity portion, in the case of applying the friction stir welding.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A friction stir welding method of inserting a tool having a pin-shaped probe protruding therefrom into member to two or more weld materials in a state of being rotated, and said tool is moved in a state of being rotated, thereby welding the two or more weld materials in accordance with a friction stirring, wherein a cavity is provided in a part of a weld portion of said two or more weld materials, an embedded member is provided in said cavity, and said two or more weld materials are welded by the friction stirring along the embedded member and at a position coming into contact with the embedded member, wherein, prior to said inserting, (a) overlapping one of the two or more weld materials with another of the two or more weld materials, each of said one and said another of the two or more weld materials having cavity portions having semicircular cross-sectional shapes, such that when overlapped the one and another of the two or more weld materials form the cavity, the cavity having a circular cross-section, and (b) embedding the embedded member in the cavity having the circular cross-section.

2. A friction stir welding method as claimed in claim 1, wherein the method welds a joint portion of said two or more weld materials in accordance with the friction stirring.

3. A friction stir welding method as claimed in claim 1, wherein the method welds said two or more weld materials in accordance with the friction stirring.

4. A friction stir welding method as claimed in claim 1, wherein said embedded member has an approximately equal cross sectional shape to that of said cavity portion.

5. A friction stir welding method as claimed in claim 1, wherein the embedded member provided in said cavity is made of a harder material than said two or more weld materials.

6. A friction stir welding method as claimed in claim 1, wherein a radius of said cavity is equal to or less than one half of a thickness of said two or more weld materials.

7. A friction stir welding method as claimed in claim 1, wherein said friction stirring forms a friction stirring zone, and said friction stirring zone contacts said embedded member.

8. A friction stir welding method as claimed in claim 1, wherein said cavity is located at an interface between weld materials being welded in accordance with the friction stirring.

9. A friction stir welding method of inserting a tool having a pin-shaped probe protruding therefrom into two or more weld materials in a state of being rotated, and said tool is moved in a state of being rotated, thereby welding the two or more weld materials in accordance with a friction stirring, wherein a cavity is provided in a part of a weld portion of said two or more weld materials, and an embedded member is provided in said cavity prior to inserting said tool into said two or more weld materials for friction stirring along the embedded member and at a position coming into contact with the embedded member, wherein said cavity is formed by a cavity portion formed in an upper surface of one of the two or more weld materials and in a bottom surface of another of the two or more weld materials, said upper surface and said bottom surface overlapping each other and being adjacent each other, said cavity portion formed in said upper surface and said cavity portion formed in said bottom surface being aligned to provide said cavity.

* * * * *